Figure 1:
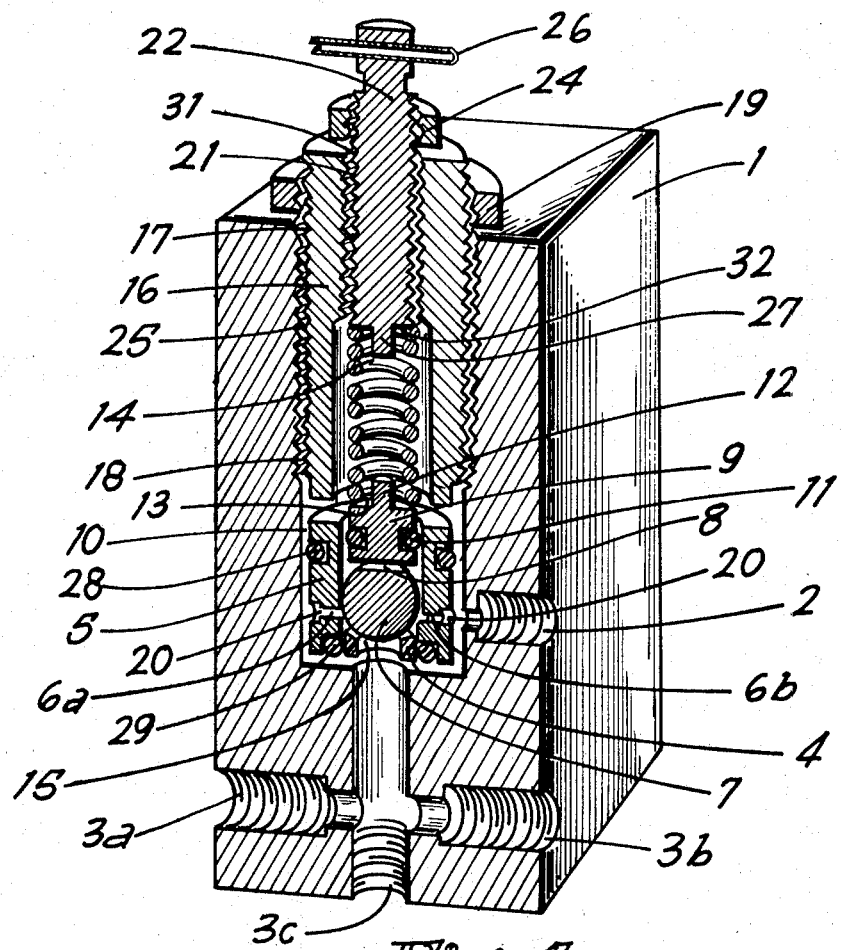

United States Patent [19]
Garamy

[11] 3,747,635
[45] July 24, 1973

[54] PRESSURE RELIEF CONTROL VALVE
[75] Inventor: Frank Garamy, Louisville, Ky.
[73] Assignee: American Air Filter Company, Inc., Louisville, Ky.
[22] Filed: May 25, 1972
[21] Appl. No.: 256,741

[52] U.S. Cl. .......................................... 137/539.5
[51] Int. Cl. ............................................ F16k 15/04
[58] Field of Search .............................. 137/539.5

[56] References Cited
UNITED STATES PATENTS
2,714,392  8/1955  Mercier ................. 137/539.5 X
2,415,258  2/1947  Parker .................... 137/539.5

Primary Examiner—Harold W. Weakley
Attorney—Ralph B. Brick, Charles G. Lamb et al.

[57] ABSTRACT

A pressure control relief valve to regulate the pressure in a fluid conduit disposed between a high pressure source and a low pressure receiving device including a valve body having a fluid inlet and a fluid outlet with a slidably mounted valve means disposed within the valve body between the fluid inlet and the fluid outlet, the slidably mounted valve means being operable in relation to the pressure applied by an adjusting means on one side and the pressure of the fluid passing into the body from the fluid inlet on the opposite side, the setting of the adjusting means being such that the fluid will not pass through the valve unless it exceeds the preset pressure exerted on the slidable valve means by the adjusting means.

2 Claims, 2 Drawing Figures

PRESSURE RELIEF CONTROL VALVE

BACKGROUND OF THE INVENTION

This invention relates to a pressure control relief valve and more particularly to a pressure control relief valve which is compact and which is arranged so that all of the working parts may be removed and replaced without disconnecting the body of the valve from a conduit carrying fluid to and away from the valve.

Pressure relief valves of the prior art generally comprise a spring loaded valve member which is seated upon a valve seat wherein the valve member is subject to movement away from the valve seat when the pressure in a fluid conduit system exceeds the pressure exerted by the counteracting spring seating force. When this occurs, the valve opens and the fluid from the fluid conduit system flows through the valve seat opening until the fluid conduit system pressure is reduced to less than the pressure exerted by the valve spring thereby seating the valve member closing off the opening in the valve seat. Most of the valves presently in use for relieving the pressure in a fluid conduit system are expensive, require a relatively large space for assembly; and, when in need of repair must be removed from the fluid conduit system.

SUMMARY OF THE INVENTION

The present invention provides a pressure control relief valve which is extremely compact and is arranged so that all of the working parts may be removed and replaced without disconnecting the body of the valve from a conduit carrying fluid to and away from the valve. It is recognized that the device provided by the present invention is straightforward, easy to fabricate, assemble and disassemble, and is highly effective.

Various other features of the present invention will become obvious to those skilled in the art upon reading the disclosure as set forth hereinafter.

More particularly, the present invention provides a pressure control relief valve to control flow of fluid from a high pressure source to a low pressure receiving device comprising: a valve body including a fluid inlet and a fluid outlet with a chamber disposed therebetween; a valve cylinder having a plurality of openings therein, at least one opening being in communication with the inlet and at least one opening in communication with the outlet, the cylinder being disposed in the chamber, the cylinder having a valve seat with an axial opening therein disposed between the inlet and the outlet openings and adaptable for receiving a slidably mounted valve means thereon, the slidably mounted valve means including a valve ball of generally the same diameter as the inner bore of the valve cylinder and adapted to be slidably mounted therein for engagement with the valve seat for closing off the axial opening, the valve ball having a flat edge thereon, the flat edge being opposite the portion of the valve ball engaging with the valve seat and adaptable for independent communication with a valve disc of generally the same diameter as the inner bore of the valve cylinder and adapted to be slidably mounted therein, the valve disc being in communication with adjusting means; and, the adjusting means being adaptable for communicating with the valve means to adjust the resisting pressure of the valve means whereby flow of fluid through the valve is controlled by the pressure exerted by the adjusting means on the valve means.

It is to be understood that the description of the example of the present invention given hereinafter is not by way of limitation and that various modifications within the scope of the present invention will occur to those skilled in the art upon reading the disclosure set forth hereinafter.

Figure 2:
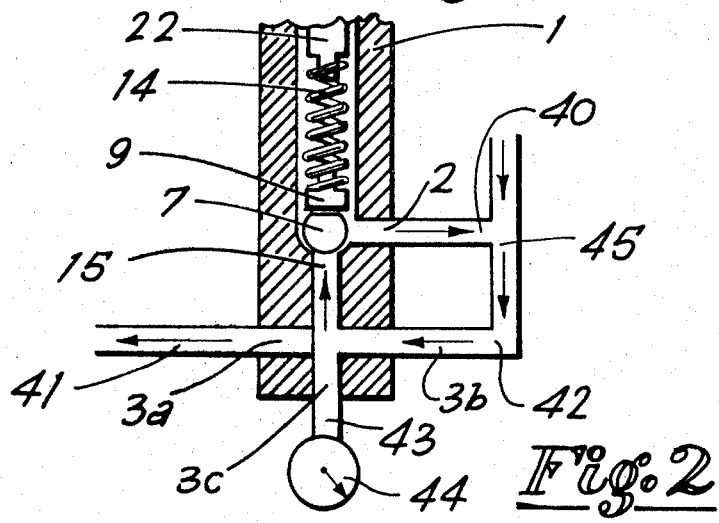

Referring to the drawing:

FIG. 1 is a perspective view of a pressure control relief valve of the present invention with selected portions cutaway; and, FIG. 2 is a schematic of a valve of FIG. 1 including a fluid flow conduit system.

As shown, a valve body 1 is provided with an outlet port 2 therein passing through one wall of the valve body 1 and communicating with a valve chamber 10, and inlet ports 3a, 3b, and 3c, each of these ports passing through walls of the valve body 1 communicating with each other and the valve chamber 10.

The ports 2 and 3a, 3b, and 3c are threaded for receiving conduits 40, 41, 42, and 43 (FIG. 2), respectively therein, these conduits being in communication with, for example, other conduits for fluid flow therein, pressure indicators, and the like. Valve body 1 is further provided with a bore 18 for receiving adjusting means and slidably mounted valve means therein, the slidably mounted valve means being in communication with the adjusting means and operable in response to the setting of the adjusting means. The bore 18 includes a threaded portion 25 therein for receiving the adjusting means, the adjusting means including spring housing 16 adaptable for being received by and engagement with the threaded portion 25, a spring 14 to be received within the housing 16, and an adjusting member 22 adapted to mate with the spring 14.

Bore 18 at its inward extremity includes the valve chamber 10, valve chamber 10 being disposed adjacent the threaded portion 25 and adaptable for receiving valve cylinder 5 therein, valve cylinder 5 being open at each end and having a channel portion 20 extending around the outer periphery thereof with a plurality of passageways therethrough, two being shown and identifiable by numerals 6a and 6b. Fluid passing through the inlet opening, identifiable by numeral 15, of the valve cylinder 5 escapes from cylinder 5 through the passageways 6a and 6b into channel 20 and out of the valve through outlet port 2. Valve cylinder 5 also includes an O-ring 28 disposed around the outer periphery of the cylinder 5 for fluid tight communication with the walls of valve chamber 10.

Disposed between the openings 6a and 6b in the valve cylinder 5 and the opening 15 is a valve seat 4 having an axial opening therein for receiving the slidably mounted valve means thereon, the slidably mounted valve means including valve ball 7 and valve disc 9. Valve ball 7 is adaptable for fluid tight engagement with the axial opening of valve seat 4 and slidable movement in the valve cylinder 5 thereby controlling the flow of fluid therethrough. Valve seat 4 includes O-ring 29 disposed around the outer periphery thereof for fluid tight communication with the walls of the valve cylinder 5.

The valve ball 7, of generally the same diameter as the inner bore of the valve cylinder 5, is provided with a flat edge 8, flat edge 8 being opposite the portion of the ball that engages with the axial opening in seat 4 and is adaptable for cooperation with a valve disc 9. The valve disc 9, of generally the same diameter as the inner bore of the valve cylinder 5, includes O-ring 11 disposed around the outer periphery thereof, O-ring 11 being a sealing member for maintaining valve disc 9 in fluid tight communication with the inner walls of the valve cylinder 5. Valve disc 9 further includes a longitudinally extending stem portion 12 and receiving ledge 13 for alignment with and receipt of one end of a spring 14, spring 14 being provided to urge valve disc 9 and valve ball 7 toward valve seat 4 to close off the valve cylinder opening 15.

A spring housing 16 having a threaded outer portion 17 for mating with threaded portion 25 of bore 18 is provided to receive spring 14 therein. Spring housing 16 is further provided with a threaded bore portion 21 for receiving an adjusting member 22 therein, adjusting member 22 having a threaded portion 31 for engagement with the threaded bore 21.

Adjusting member 22 includes a longitudinally extending stem portion 27 and receiving ledge 32 for alignment with and receipt of the opposite end of the spring 14. Adjusting member 22 further includes a handle 26 for rotation of the adjusting member 22 out of or into the spring housing 16. By rotation of the adjusting member 22, spring 14 is urged toward or released from cooperating valve disc 9.

A lock nut 19 is provided for communicating with the threaded portion 17 of the spring housing 16 for preventing the spring housing from slacking back once it is positioned in its preselected position. Further, a lock nut 24 is provided to engage with the threaded portion 31 of adjusting member 22 to prevent the adjusting member 22 also from slacking back.

It will be noted in the example shown, the valve can be easily disassembled by removing the adjusting member 22 in the spring housing 16 whereby valve cylinder 5, valve disc 9, and valve ball 7 may then be removed from the valve chamber 10.

In FIG. 2, one example of the pressure control relief valve of the present invention in a fluid flow conduit system is schematically illustrated. Outlet port 2 having a threaded bore therein is connected to a conduit 40, conduit 40 being a return conduit of fluid to high pressure flow conduit 45, conduit 45 being in communication with a high pressure fluid source. Port 3c having a threaded bore therein, is connected to a pressure indicator 44 through conduit 43. Ports 3a and 3b, also having threaded bores therein and being in communicative relation therewith are connected to conduits 41 and 42 thereby allowing for the passing of fluid through the valve body 1. Conduit 42 is also in communication with conduit 45 for receiving fluid from a high pressure source and conduit 41 is in communication with a low pressure receiving device.

In operation, adjusting member 22 is rotated inwardly urging spring 14 against valve disc 9 exerting pressure on the valve ball 7 pressing the valve ball 7 against the valve seat 4 thereby closing off the valve cylinder opening 15. The high pressure fluid is then allowed to pass through the port 3b at full line pressure. Adjusting member 22 is then rotated outwardly to release pressure on spring 14, in turn releasing valve ball 7 from fluid tight communication with opening 15. As the adjusting member 22 is continued in its outward movement, pressure upon spring 14 is released and flow of fluid is initiated through opening 15 and out through outlet 2. Adjusting member 22 is continued in its outward rotation until the desired pressure on the pressure indicator 44 is obtained. Lock nut 24 is then adjusted downwardly until it meets with the spring housing 16 thereby preventing the slacking back of the adjusting member 22 which in turn sets the pressure necessary to initiate the flow of fluid through the valve.

It will be realized that various changes may be made to the specific embodiments shown and described without departing from the principles and spirit of the present invention.

What is claimed is:

1. A pressure control relief valve to control flow of fluid from a high pressure source to a low pressure receiving device comprising: a valve body including a fluid inlet and a fluid outlet with a chamber disposed therebetween; a valve cylinder having a plurality of openings therein, at least one opening being in communication with said inlet and at least one opening in communication with said outlet, said cylinder being disposed in said chamber, said cylinder having a valve seat with an axial opening therein disposed between said inlet and said outlet openings and adaptable for receiving a slidably mounted valve means thereon, said slidably mounted valve means including a valve ball of generally the same diameter as the inner bore of said valve cylinder and adapted to be slidably mounted therein for engagement with said valve seat for closing off said axial opening, said valve ball having a flat edge thereon, said flat edge being opposite the portion of said valve ball engaging with said valve seat and adaptable for independent communication with a valve disc of generally the same diameter as said inner bore of said valve cylinder and adapted to be slidably mounted therein, said valve disc being in communication with adjusting means; and, said adjusting means being adaptable for communicating with said valve means to adjust the resisting pressure of said valve means whereby flow of fluid through said valve is controlled by the pressure exerted by said adjusting means on said valve means.

2. The pressure control relief valve of claim 1, said adjusting means including an adjusting member adaptable for communication with a spring, said spring being biased between said adjusting member and said valve means whereby movement of said adjusting member determines the pressure on said valve means.

* * * * *